Feb. 20, 1951   O. F. HOPPE   2,542,030
MAGNETICALLY SUPPORTED INDICATING BORE GAUGE
Filed April 16, 1945
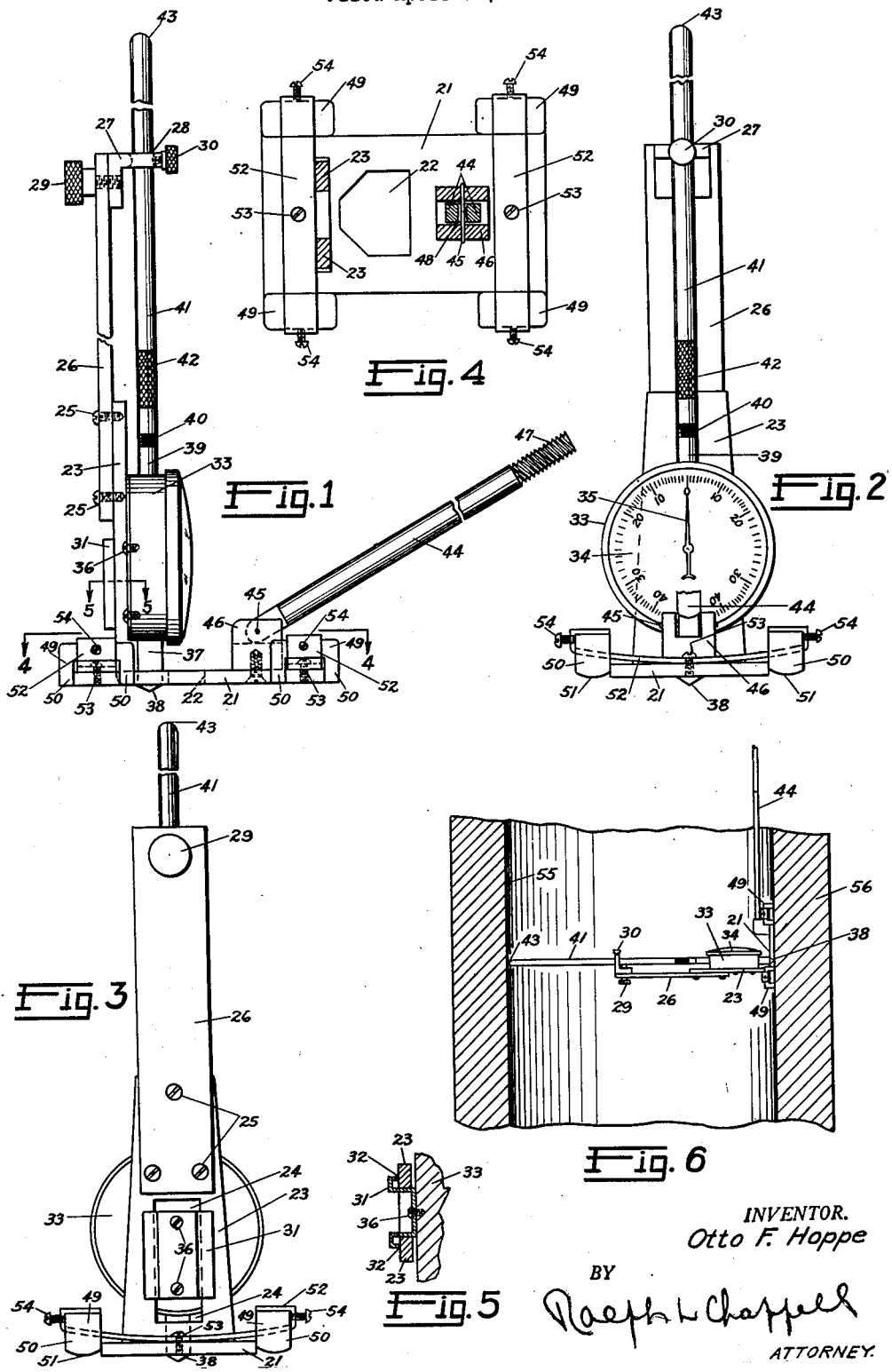
INVENTOR.
Otto F. Hoppe
BY
Ralph L. Chappell
ATTORNEY.

Patented Feb. 20, 1951

2,542,030

UNITED STATES PATENT OFFICE 2,542,030

MAGNETICALLY SUPPORTED INDICATING BORE GAUGE

Otto F. Hoppe, New York, N. Y.

Application April 16, 1945, Serial No. 588,514

4 Claims. (Cl. 33—178)

(Granted under the act of March 3, 1883, as amended April 30, 1928; 370 O. G. 757)

This invention relates to indicating instruments for determining variations or irregularities in the contour or dimensions of the surface of a magnetic material, such as variations in the diameter of a cylinder bore, and more particularly relates to means by which true readings can be taken quickly and accurately when using such a device.

In the use of an indicating instrument for work of this type, it has been customary to employ hand pressure to hold the instrument against the surface of the magnetic material while readings are being taken. This has necessitated great pains and caution on the part of the operator, particularly when working with rounded surfaces. It has required him to center the instrument correctly and prevent its tilting or moving out of line while simultaneously sliding it over the surface being tested during the time he is taking readings of the variations on the measuring device. Thus the degree of accuracy in the reading taken by such a method depended to a large extent upon the skill of the operator.

It is an object of this invention, therefore, to provide an instrument for determining quickly and accurately irregularities in the surface of a magnetic material.

Another object is to provide means for centering an indicating gauge longitudinally upon a rounded surface of a magnetic material.

A further object is to provide an indicating instrument having a magnetized portion for retaining the said instrument slidably against the surface of a magnetic material.

Another object is to provide an indicating instrument having magnetic means for retaining the said instrument slidably against a surface of a magnetic material in which the said magnetic means are adjustable to the curvature of a rounded surface.

A still further object is to provide an automatically self-centering indicating instrument for use upon rounded surfaces of magnetic material.

Further objects and advantages of this invention as well as its construction, arrangement and operation will be apparent from the following description and claims in connection with the accompanying drawing, in which Fig. 1 is a side elevation view of one embodiment of the indicating instrument of this invention;

Fig. 2 is a front elevation thereof;

Fig. 3 is a rear elevation thereof;

Fig. 4 is a sectional view taken on the line 4—4 of Fig. 1 and showing the magnetic base or sled of the indicating instrument;

Fig. 5 is a fragmentary sectional view taken on the line 5—5 of Fig. 1 and showing the manner in which the indicating gauge is attached to its support; and Fig. 6 is a view showing the indicating instrument in operating position within a cylinder.

Similar numerals refer to similar parts throughout the several views.

Fig. 1 shows a base or sled 21 having an opening 22 (Fig. 4) in its after midsection and supporting an upright 23 also containing an opening 24 (Fig. 3) of a rectangular shape. The upright 23 is fixed rigidly to the base 21 and is in a plane perpendicular thereto. Fixed to the upright 23, as by screws 25, is an extension member 26, which can be of any desired length depending upon the width of the opening or cavity to be gauged by the instrument. The device can be provided with several of these extension members 26, which are interchangeable as desired. A guide member 27 having an opening 28 is attached by a thumbscrew 29 to the upper portion of the extension member 26. A thumb-operated setscrew 30 provided upon the guide member feeds into the opening 28 and is adapted to close said opening 28.

Mounted slidably upon the upright 23 and held thereon by a clamp 31 (Fig. 5) extending through the rectangular opening 24 and engaging the rear face of the upright 23, as at 32, is an indicating gauge 33 having a graduated dial 34 and an indicator needle 35 (Fig. 2). The clamp 31 is attached to the back portion of the gauge 33 by screws 36. A fixed stem 37 having a rounded tip 38 extends from the base of the gauge 33 and through the opening 22 in the base or sled 21, while a movable stem or plunger 39 operable upon the gauge mechanism to actuate the needle 35 extends from the top of the gauge 33. The gauge obviously can be reversed, with the movable stem extending through the base 21 of the instrument. The movable stem 39 moves into the gauge 33 against the tension of a spring mechanism (not shown). The top portion of the movable stem 39 is provided with threads 40 or other connecting means for receiving an extension rod 41. This rod 41 is threaded internally at one end and has a raised knurled portion 42 so that it can be rotated with the finger tips and screwed onto the stem 39. The rod 41 extends through the opening 28 in the guide member 27 and is supported thereby. The tip 43 of the extension rod 41 is rounded in a similar manner to the tip 38 of the fixed stem 37, these being the contact points when the gauge is in operation. A set of extension rods 41 of different lengths can be provided for gauging openings of different dimensions. The gauge 33 and its assembly consisting of the clamp 31, fixed stem 37, and the movable stem 39 and its extension 41 are slidable freely normal to the base member 21 and parallel to the upright 23 for a distance equal to the entire length of the rectangular opening 24.

The device is further provided with a handle 44 attached pivotally by means of a pin 45 to a U-shaped pedestal 46 fixed to the base 21. Said handle is threaded at one end, as at 47, for the addition of extension handles (not shown) so that it can be used in openings or cavities remote from the operator, as at the bottoms of cylinders in large engines. The internal dimensions of the U-shaped pedestal 46 and of the hole 48 in the handle 44 through which the pin 45 extends (Fig. 4) are such that a little play is allowed the handle 44 relative to the longitudinal axis of the base 21. The handle 44 is also free to move up and down around the pin 45 as an axis.

An important feature of the present invention resides in the provision of a magnetized portion for retaining the instrument slidably with substantially uniform pressure against the surface of the magnetic material being gauged. This is accomplished in the device as shown by attaching four U-shaped magnets 49 having shanks 50 with rounded tips 51 to the base 21. One magnet 49 is attached to each corner of the base, and held in place by clamps 52 that are fixed to the base 21 by screws 53. The base 21 and clamps 52, the only portions of the device contacting the magnets 49, are made of a non-magnetic material such as brass or aluminum. It is preferable also that the clamps 52 be constructed of a material that is flexible or spring-like so that they will resume their former shape after distortion.

Setscrews 54 positioned at each end of the clamps 52 are operable against the sides of the magnets 49. By drawing up upon these setscrews 54 a turning moment is applied to the magnets 49, causing them to toe outward and at the same time causing the clamps 52 to assume a curvature having a smaller radius. This enables the device to be used upon a rounded surface such as to measure variations in the diameter of the bore 55 of an engine cylinder 56 (Fig. 6). Thus by adjusting the setscrews 54, the magnets 49 can be set so that a longitudinal axis through each shank 50 is approximately normal to a tangent to the rounded surface at the point of contact. Only a rough adjustment is necessary, however, as the device will operate effectively when the point of contact is anywhere on the rounded portion 51 of the shank. Upon releasing the setscrews 54, the clamps 52 spring back to their original position.

In operation, for example in determining variations in the internal diameter of a cylinder bore 55, an extension rod 41 is selected which, with the gauge 33 and its fixed stem 37, will make the distance between the tips 38 and 43 slightly greater than the internal diameter of the cylinder to be gauged. Such rod 41 is inserted through the opening 28 in the guide member 27. The thumbscrew 29 can be loosened and the guide member 27 twisted slightly to allow this to be accomplished easily. The rod 41 is then screwed in place upon the movable stem or plunger 39 and the guide member 27 is secured in the proper position by tightening thumbscrew 29.

The distance between the points of contact 43 and 38 upon the extension rod 41 and the fixed stem 37 is now adjusted to the ostensible diameter of the cylinder to be gauged by using an outside micrometer caliper (not shown) and moving the stem 39 into the gauge 33 against the tension of the spring (not shown) within the instrument. When the proper length between the contact points is attained, as determined by the outside micrometer caliper, the stem 39 and extension rod 41 are locked against further movement by tightening setscrew 30. The dial face 34 is now turned until the needle 35 points to the zero mark.

The magnets 49 are now adjusted by operating setscrews 54 until the rounded ends 51 contact the cylinder walls. The instrument is then lowered into the cylinder (as shown in Fig. 6) by holding the handle 44 and the setscrew 30 is released. The spring tension within the gauge 33 holds the tip 43 of the rod 41 against one face of the cylinder wall 55 and moves the gauge 33 until the tip 38 of the fixed stem 37 contacts the opposite wall 55.

The device can be raised and lowered within the cylinder as desired to take the usual readings. While this is being done, the magnets cling firmly but slidably to the surface of the cylinder walls, preventing tilting and holding the device steady at all times. Variations in the diameter of the cylinder bore 55 are indicated by the fluctuations of the needle 35 on the dial 34. By raising and lowering the device several times within the cylinder, the instrument will adjust itself automatically so that the longitudinal axis of the base 21 is exactly parallel to the longitudinal axis of the cylinder, thus insuring the exact gauging of the cylinder around its longitudinal center. The play left in the connection between the handle 44 and the pedestal 46 prevents the operator from influencing the centering operation unduly. Extension handles can be added as the device is lowered deeper into the cylinder. The centering and gauging operation that once required hours of tedious operation, resulting in readings of doubtful accuracy and wide variations, is now accomplished accurately in a matter of minutes with the new device.

Various modifications and changes can be made in the subject device without departing from the scope of the invention.

The invention described herein may be manufactured and used by or for the Government of the United States of America for governmental purposes without the payment of any royalties thereon or therefor.

I claim:

1. An indicating instrument for gauging internal cylinders of magnetic material comprising a base, a support mounted normal thereto, a spring-controlled indicating gauge mounted slidably on said support and having stem members adapted to contact diametrically opposed portions of said cylinder, a resilient arcuate clamp secured to each end of said base and projecting from each side thereof, a magnet supported at each end of said clamps adjacent said base, and means for adjusting the magnets with respect to said clamps and for adjusting the curvature of said clamps whereby said magnets are selectively adjustable to make contact with cylinders of different diameters.

2. An indicating instrument for gauging internal cylinders of magnetic material comprising a base, a support mounted normal thereto, an indicating gauge mounted slidably on said support and having members adapted to contact diametrically opposed portions of such cylinder, a plurality of clamps secured to said base and projecting therefrom, pairs of said clamps being positioned equidistantly from the longitudinal axis of said members, and magnets secured to each of said clamps.

3. An indicating instrument for gauging internal cylinders of magnetic material comprising a base, a support mounted normal thereto, an indicating gauge mounted slidably on said support and having members adapted to contact diametrically opposed portions of such cylinder, a plurality of clamps secured to said base and projecting therefrom, pairs of said clamps being positioned equidistantly from the longitudinal axis of said members, magnets secured to each of said clamps, and means to bend portions of said clamps to vary the orientation of said magnets relative said base.

4. An indicating instrument for gauging internal cylinders of magnetic material comprising a rectangular base of non-magnetic material having a medial opening, a support mounted normal to said base, an indicating gauge mounted slidably on said support, said gauge having members adapted to contact diametrically opposed portions of such cylinder, one of said members extending through the opening in said base, a plurality of clamps of non-magnetic material secured to said base, a plurality of U-shaped magnets having shanks with rounded tips positioned at the corners of said base and secured by said clamps, and means to vary the orientation of a portion of said clamps to vary the positions of said tips.

OTTO F. HOPPE.

REFERENCES CITED

The following references are of record in the file of this patent:

UNITED STATES PATENTS

| Number | Name | Date |
|---|---|---|
| 1,591,258 | Ames | July 6, 1926 |
| 1,619,771 | Tingley | Mar. 1, 1927 |
| 1,625,766 | Simpson | Apr. 19, 1927 |
| 1,778,481 | Boucher | Oct. 14, 1930 |
| 1,888,454 | Edson | Nov. 22, 1932 |
| 1,895,643 | Putnam | Jan. 31, 1933 |
| 1,966,984 | Lichtenberger et al. | July 17, 1934 |
| 2,088,362 | Blazek et al. | July 27, 1937 |
| 2,322,033 | LeBrun | June 15, 1943 |